United States Patent
Akhtar et al.

(10) Patent No.: US 8,982,893 B2
(45) Date of Patent: Mar. 17, 2015

(54) SYSTEM AND METHOD OF QUALITY OF SERVICE ENABLEMENT FOR OVER THE TOP APPLICATIONS IN A TELECOMMUNICATIONS SYSTEM

(75) Inventors: Haseeb Akhtar, Garland, TX (US); Brenda Ann Connor, College Station, TX (US); John Carey Barney, Jr., Murphy, TX (US); Sean Kendall Schneyer, The Colony, TX (US); Solomon Israel, Dallas, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 561 days.

(21) Appl. No.: 12/782,790

(22) Filed: May 19, 2010

(65) Prior Publication Data
US 2011/0219431 A1 Sep. 8, 2011

Related U.S. Application Data

(60) Provisional application No. 61/310,320, filed on Mar. 4, 2010.

(51) Int. Cl.
 *H04L 12/28* (2006.01)
 *H04J 3/24* (2006.01)
 *G06F 15/16* (2006.01)
 *H04L 12/24* (2006.01)
 *H04L 29/08* (2006.01)

(52) U.S. Cl.
 CPC .......... *H04L 41/5054* (2013.01); *H04L 67/322* (2013.01); *H04L 67/2833* (2013.01)
 USPC ........... 370/401; 370/389; 370/431; 370/474; 709/219

(58) Field of Classification Search
 USPC ................................ 370/401; 709/206; 724/4
 See application file for complete search history.

(56) References Cited

U.S. PATENT DOCUMENTS

2002/0143981 A1* 10/2002 DeLima et al. ............... 709/233
2003/0035409 A1  2/2003 Wang et al.
(Continued)

OTHER PUBLICATIONS

ETSI Standard, Open Service Access (OSA); Parlay X Web Services; Part 17: Application-driven Quality of Service (QoS); (Parlay X 3); ETSI ES 202 504-17 V1.1.1 (2008-05) Sophia Antipolis Cedex - France.

*Primary Examiner* — Yemane Mesfin
*Assistant Examiner* — Peter Chen

(57) ABSTRACT

A system, method, and node providing a predefined Quality of Service (QoS) level to an Over The Top (OTT) service provider in a telecommunications network. A User Equipment (UE) initiates an IP-based application session (e.g., Hyper Text Transfer Protocol (HTTP) session) with the OTT service provider by sending an application-dependent message toward an OTT application server. The method begins with a proxy node in the telecommunications network intercepting the application-dependent message. The proxy node then modifies the application-dependent message by adding a subscriber identification to the header of the application-dependent message. The proxy node forwards the modified application-dependent message to the OTT application server. The OTT application server then sends a request having the subscriber identification to the telecommunications network with a QoS requirement for the HTTP session. Next, a network policy node determines an appropriate QoS level for the subscriber. A network gateway then enforces the determined QoS level for the HTTP session with the OTT service provider.

18 Claims, 6 Drawing Sheets

(56) References Cited

U.S. PATENT DOCUMENTS

| | | | |
|---|---|---|---|
| 2006/0218302 A1* | 9/2006 | Chia et al. | 709/245 |
| 2006/0262812 A1* | 11/2006 | Liu et al. | 370/477 |
| 2006/0274730 A1* | 12/2006 | Medlock et al. | 370/352 |
| 2008/0014939 A1* | 1/2008 | Chang | 455/435.2 |
| 2009/0154397 A1* | 6/2009 | Akhtar | 370/328 |
| 2009/0310541 A1* | 12/2009 | Watanabe | 370/328 |
| 2010/0103837 A1* | 4/2010 | Jungck et al. | 370/252 |

* cited by examiner

Go to FIG. 5B

SYSTEM AND METHOD OF QUALITY OF SERVICE ENABLEMENT FOR OVER THE TOP APPLICATIONS IN A TELECOMMUNICATIONS SYSTEM

CROSS-REFERENCE TO RELATED APPLICATIONS

This application claims the benefit of U.S. Provisional Application No. 61/310,320 filed Mar. 4, 2010, the disclosure of which is incorporated herein in its entirety.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The present invention relates to communications networks. More particularly, and not by way of limitation, the present invention is directed to a system and method of Quality of Service (QoS) enablement for Over The Top (OTT) Applications in a telecommunications network.

With the increased popularity and enhanced services available on the Internet, a wide variety of OTT service providers such as Google®, Skype®, Vonage®, Facebook®, etc. have established a large base of subscribers. This phenomenon has made "bit pipes" out of the carriers, which removes service carriers from lucrative revenue opportunities in the services domain.

Today's service carriers prefer to be a part of the value chain by utilizing their assets (i.e., subscriber base, network components etc.). However, a relationship between the carriers and OTT service providers has not been forthcoming due to a lack of technical and business solutions that can merge their independent assets with their subscriber bases.

The current solution does not allow the OTT service providers to deliver their applications over the QoS-based communication channels. In this specific case, the current QoS request sent by the OTT service providers to the carriers does not have enough information for the carriers to identify the specific user with the QoS needs. This is because the request from the OTT service provider contains only the user's IP address without any other information. Typically the IP address associated with the user that arrives from the OTT service providers to the carriers' network undergoes a translation process in the Network Address Translation (NAT) function. This makes it difficult to uniquely associate the IP address to a user by the time a QoS request (from the OTT service providers) is received by the carriers' policy enforcement server, thus rendering it impossible for the carriers' network to apply the QoS to that specific user.

FIG. 1 is a simplified block diagram of an existing telecommunications system 10 illustrating the problem of IP address to user identity association. The telecommunications network includes a third party Application Server (AS), the Internet 14, a Network Address Translation (NAT) 16, a managed Internet Protocol (IP) network 18 and a Policy and Charging Rules Function (PCRF) 20. In this example, there are three zones, each having a User Equipment (UE). Zone one includes a Packet Data Network (PDN) Gateway (PGW) 30, a plurality of enhanced Node B (eNB) 32 and 34, and a UE 36 operating in a 4$^{th}$ Generation (4G) Radio Access Network (RAN) 38. Zone two includes a PDN GW 40, a plurality of eNB 42 and 44, and a UE 46 operating in a 4G RAN 48. Zone three includes a PDN GW 50, a plurality of eNB 52 and 54, and a UE 56 operating in a 4G RAN 58. In one example, the three different UEs 36, 46, and 56 are in separate zones. However, in this example, each UE has the same private IP address (e.g., 10.1.1.12). While accessing the Internet 14, the NAT 16 assigns each UE the same public IP address (e.g., 135.12.1.1), but with different port numbers. The UE 36 may initiate an IP-based application (e.g., Hyper Text Transfer Protocol (HTTP)) session with the third party AS 12. In response, the third party AS 12 sends a Policy Control message, such as an Rx message, to the PCRF 20. The PCRF 20 receives the Policy Control message with the UE 36's private IP address (i.e., 10.1.1.12). The PCRF is unable to resolve the IP address to a specific UE. Thus, a QoS request is unable to be sent or fulfilled.

SUMMARY

The present invention provides QoS enablement of OTT Applications in a telecommunications network. The present invention provides this QoS enablement by performing header enrichment in the uplink and translating a WS/Restful/API-based QoS request into a Policy Control message.

In one embodiment, the present invention is directed to a method of providing a predefined QoS level to an OTT service provider in a telecommunications network in which a UE initiates an IP-based application session (e.g., an HTTP session) with the OTT service provider by sending an application-dependent message (e.g., an HTTP message) toward an OTT application server. A proxy node in the telecommunications network intercepts the application-dependent message and modifies the application-dependent message by adding a subscriber identification to the header of the application-dependent message. The proxy node then forwards the modified application-dependent message to the OTT application server. The OTT application server then sends a request having the subscriber identification to the telecommunications network with a QoS requirement for the IP-based application (e.g., HTTP) session. Next, a network policy node determines an appropriate QoS level for the subscriber. A network gateway then enforces the determined QoS level for the IP-based application (e.g., HTTP) session with the OTT service provider.

In another embodiment, the present invention is directed to a system for providing QoS to an OTT service provider in a telecommunications network in which a UE initiates an IP-based application (e.g., HTTP) session with the OTT service provider by sending an application-dependent message toward an OTT application server. The system includes an OTT application server for providing an OTT service by the OTT service provider in the telecommunications network. The OTT application server is capable of initiating an IP-based application (e.g., HTTP) session upon receipt of the application-dependent message. The system also includes a proxy function within the telecommunications network. The proxy function intercepts the application-dependent message prior to receipt by the OTT application server, modifies the application-dependent message by adding a subscriber identification associated with the UE to a header of the application-dependent message, and forwards the modified application-dependent message to the OTT application server. The OTT application server sends a request having the subscriber identification to the telecommunications network with a QoS requirement for the IP-based application (e.g., HTTP) session. Furthermore, the system includes a network policy node for determining an appropriate QoS level for the IP-based application (e.g., HTTP) session based on the subscriber identification and the QoS requirement. In addition, the system includes a network gateway for enforcing the determined QoS level for the IP-based application (e.g., HTTP) session with the OTT service provider.

In another embodiment, the present invention is directed to a node for enabling a telecommunications network to provide a QoS level to an OTT service provider. The node intercepts an application-dependent message sent by a UE initiating an IP-based application (e.g., HTTP) session with an OTT application servicer prior to receipt by the OTT application server. The node then modifies the application-dependent message by adding a subscriber identification to a header of the application-dependent message and forwarding the modified application-dependent message to the OTT application server. When the OTT application server sends a request having the subscriber identification to the telecommunications network with a QoS requirement for the IP-based application (e.g., HTTP) session, the network determines an appropriate QoS level for the subscriber and enforces the determined QoS level for the IP-based application (e.g., HTTP) session with the OTT service provider.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

The present invention is a system and method for QoS enablement of OTT Applications in a telecommunications network. QoS for the OTT service providers is achieved by performing header enrichment in the uplink and translating a WS/RESTful/Application Programming Interface (API)-based QoS request into a Policy Control (e.g., Rx) message.

Figure 1:
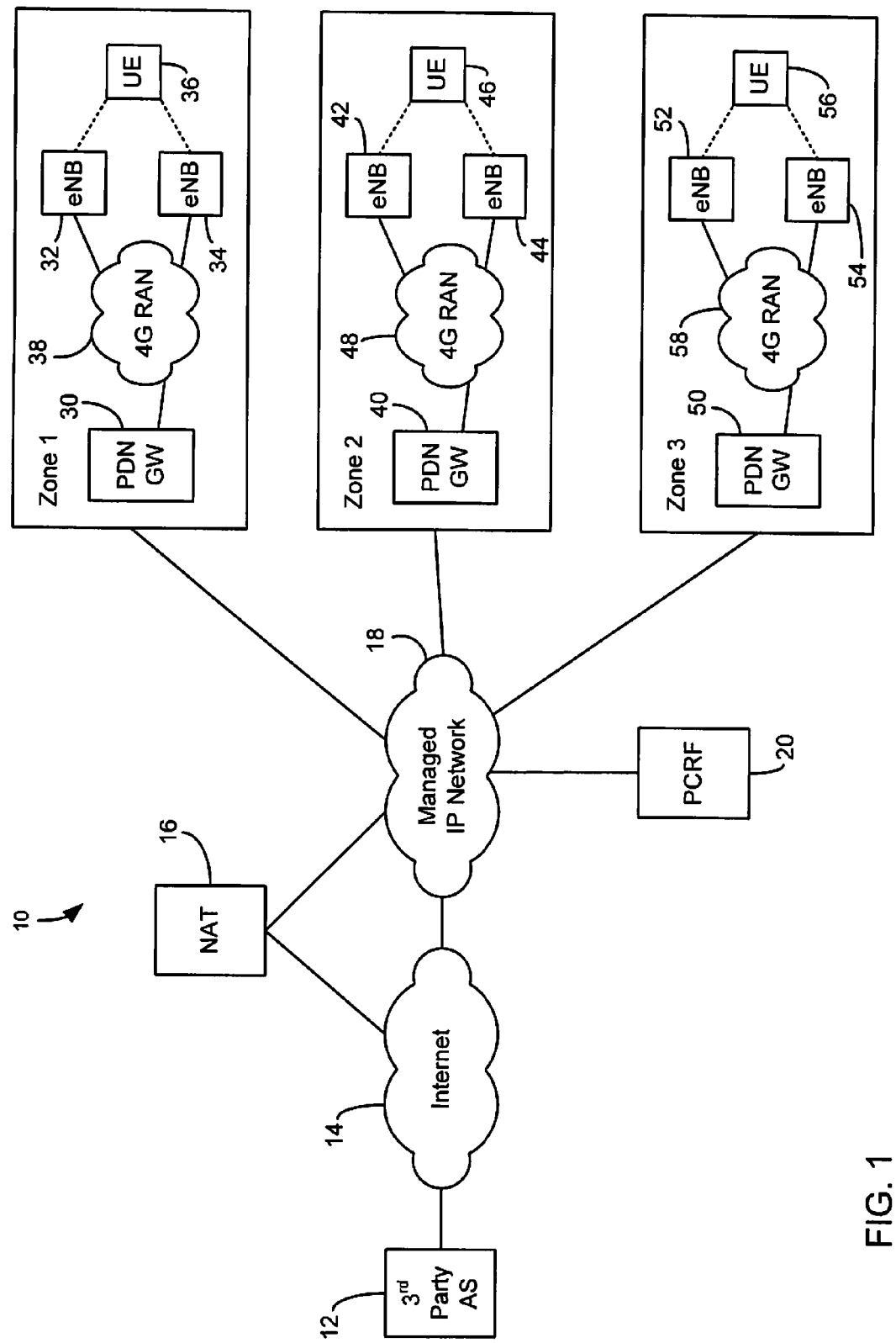
FIG. 1 (Prior Art) is a simplified block diagram of an existing telecommunications system illustrating the problem of IP address to user identity association.
Figure 2:
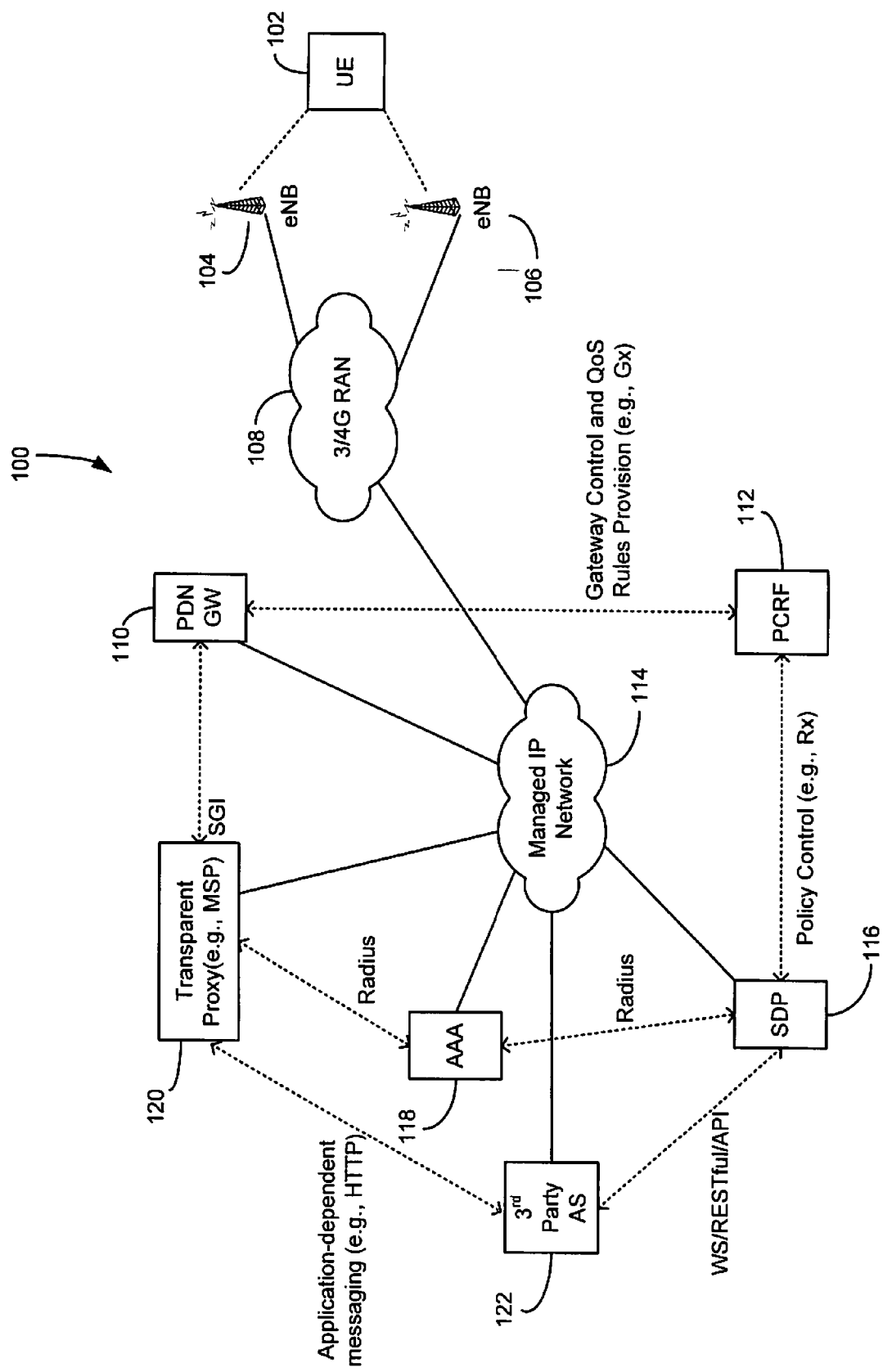
FIG. 2 is a simplified block diagram illustrating a telecommunications system providing QoS enablement for OTT Applications in the preferred embodiment of the present invention.

FIG. 2 is a simplified block diagram illustrating a telecommunications system 100 providing QoS enablement of OTT Applications in the preferred embodiment of the present invention. The system 100 includes a UE 102 communicating through one or more eNBs 104 and 106 to a Third Generation (3G) or Fourth Generation (4G) RAN 108. The system also includes a PDN GW 110, a PCRF 112, a managed IP network 114, a Service Delivery Platform (SDP) 116, an Authentication, Authorization and Accounting (AAA) server 118, a proxy node, such as a Transparent Proxy 120 (for example a Multi-Service Proxy (MSP)), and a third party AS 122.

With reference to FIG. 2, the operation of providing QoS for OTT service applications will now be explained. The UE 102 initiates an IP-based application (e.g., HTTP) session with the third party AS 122 (such as Google®, Skype®, Vonage®, Facebook®, etc.) by sending an application-dependent message, such as an HTTP message. The proxy node in the carriers' network, such as the Transparent Proxy 120, intercepts the application-dependent message before it traverses any NAT or firewall. The Transparent Proxy may query a database server, such as the AAA server 118 to download the user profile of the UE 102. The Transparent Proxy also modifies the application-dependent message by adding a unique user ID to a message header, such as an HTTP/Real Time Streaming Protocol (RTSP) header (i.e., header enrichment) before forwarding the message to the third party AS 122. The Transparent Proxy may also include the UE capabilities within the Message header. The Transparent Proxy then forwards the modified application-dependent message to the third party AS. However, the third party AS is completely oblivious to the Message header enrichment. The third party AS 122 then sends a Web Services (WS)/RESTful/API request to the SDP 116 with the QoS requirements for the session. In one embodiment, the SDP 116 may be a Services Integration Gateway (SIG) and/or an Ericsson Composition Engine (ECE). The SDP may conduct an application layer authentication with the AAA server 118. In addition, the SDP converts the WS/RESTful/API request to a Policy Control message, such as an Rx message, and forwards it to the PCRF 112. The Policy Control message contains the unique subscriber Identification (ID) which was earlier included in the application-dependent message (e.g., HTTP/RTSP) header.

Upon receiving the Policy Control message from the SDP, the PCRF 112 first identifies the subscriber by utilizing the unique subscriber ID. The PCRF then sends a gateway control and QoS rules provisioning message (e.g., Gx, Gxa etc.) to the PDN GW 110 with the proper QoS requirements. The PDN GW 110 then enforces the QoS in the 3/4G RAN 108. The UE may then accomplish an IP-based application (e.g., HTTP) session with the appropriate QoS.

Figure 3:
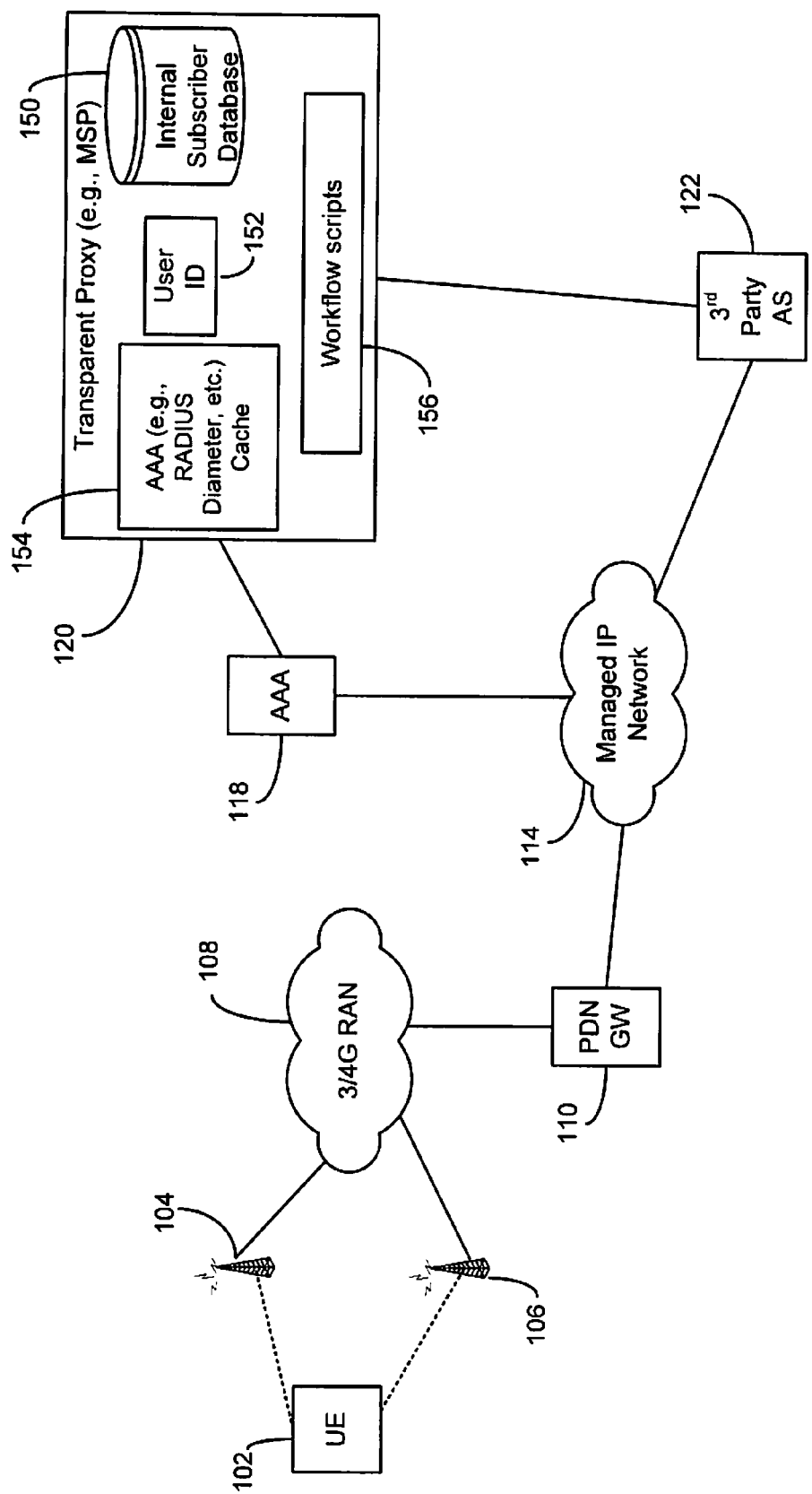
FIG. 3 is a simplified block diagram illustrating the interfaces necessary to provide the header enrichment in the application-dependent message (e.g., HTTP/RTSP) header in the present invention.

FIG. 3 is a simplified block diagram of the system 100 illustrating the interfaces necessary to provide the header enrichment in the application-dependent message (e.g., HTTP/RTSP) header. The Transparent Proxy 120 includes an internal subscriber database 150 having information on the subscribers and the corresponding QoS. The Transparent Proxy also includes the User ID 152 of each subscriber and an AAA (e.g., Radius, Diameter, etc.) cache 154. The AAA cache 154 is the temporary storage within the Transparent Proxy for the user profile received from the AAA server 118 at an earlier time. The Transparent Proxy utilizes workflow scripts 156 to implement the header enrichment. The UE 102 sends the application-dependent message (e.g., HTTP/RTSP) request, which is intercepted by the Transparent Proxy 120. The Transparent Proxy retrieves the MSSISD, the International Mobile Subscriber Identity (IMSI), etc. and includes this information in the application-dependent message (e.g., HTTP/RTSP) header. The AAA server 118 may send this information at accounting start. The Transparent Proxy assigns a trust level for each OTT server. Additionally, the Transparent Proxy, through the workflow scripts 156, specifies information to be forwarded for each trust level and application Uniform Record Locator (URL). Furthermore, the Transparent Proxy specifies for each information element if it should be in clear text or encrypted. The Transparent Proxy may also define encryption keys for each URL. The application-dependent message (e.g., HTTP/RTSP) request is then forwarded from the Transparent Proxy to the OTT server (third party AS 122).

Figure 4:
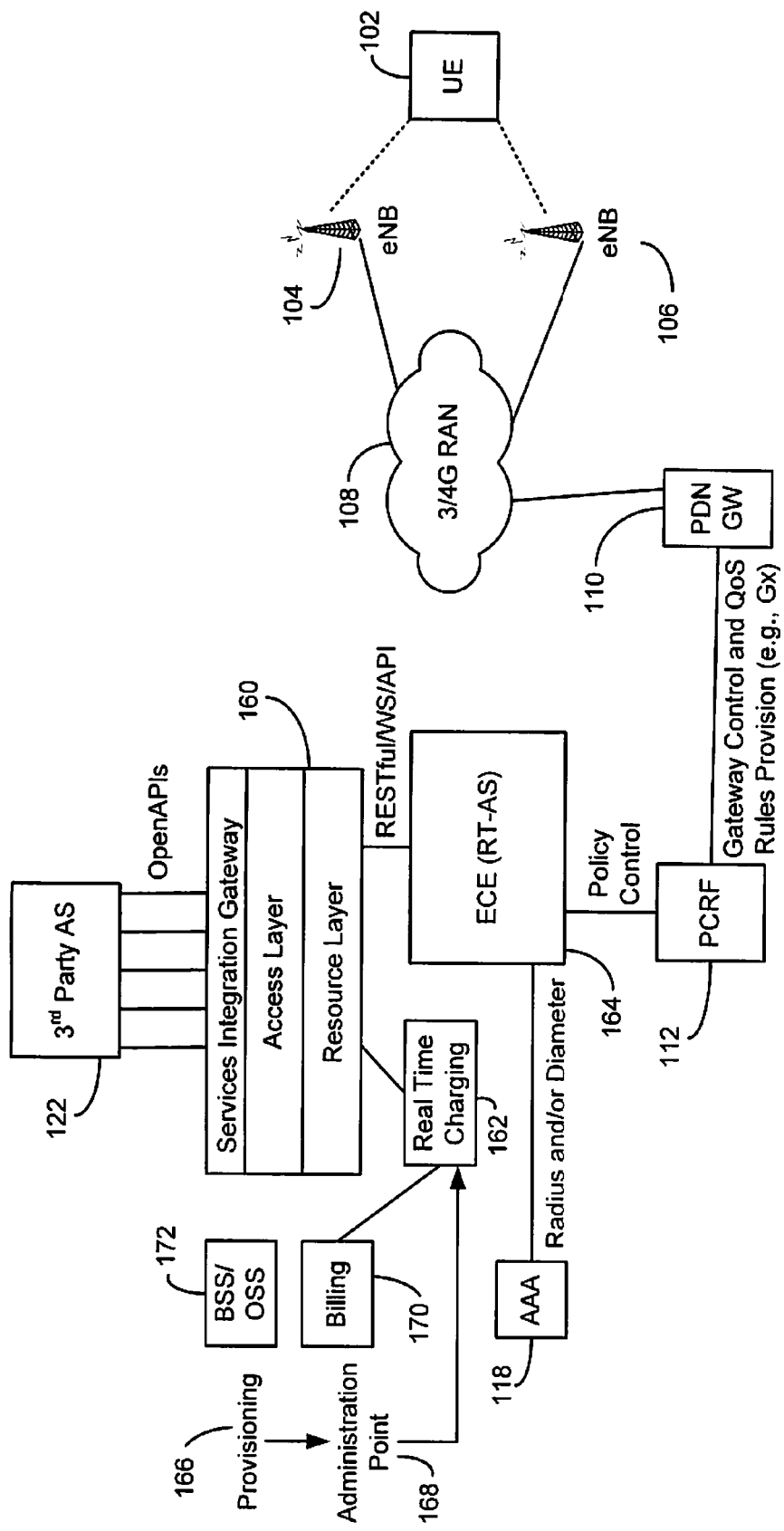
FIG. 4 is a simplified block diagram illustrating the interfaces for initiating a QoS trigger.

FIG. 4 is a simplified block diagram illustrating the interfaces for initiating a QoS trigger. The OTT AS can send the QoS request by using the procedure specified in Part 17-Application Driven QoS (ADQ) of Parlay X or its equivalent WS/RESTful/API based procedures. FIG. 4 illustrates the interface between the third party AS 122 and a Services Integration Gateway (SIG) 160. Specifically, the interface may include OpenAPIs (e.g., Web Services (WS), such as Parlay X Part 17 based ADQ or RESTful or other equivalent APIs). The SIG includes an access layer providing common functions such as Service Level Agreement (SLA), throttling, logging, aliasing, privacy, charging, Charge Data Record (CDR), alarming, reporting partner, etc. The SIG also includes a resource layer. The SIG communicates with a real time charging module 162 and a Real Time Application Server (RT-AS)) 164, such as an Ericsson Composition Engine (ECE). Provisioning is provided at 166 to an Administration Point 168 providing service model and workflow management. The Administration Point provides the information to the real time charging module 162. The real time charging module interfaces with a billing module 170 and a Business Support Systems/Operations Support Systems (BSS/OSS) 172.

Figure 5A:
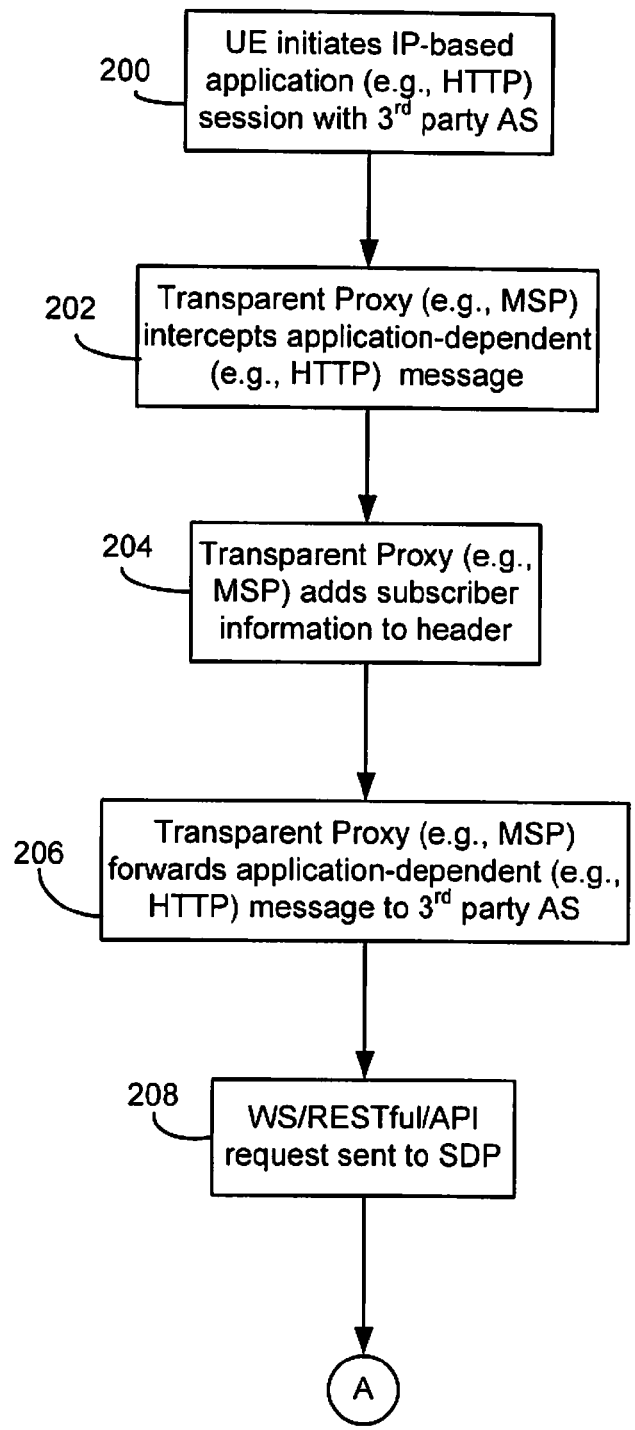
FIGS. 5A and 5B are portions of a flowchart illustrating a method of providing QoS for OTT service providers.
Figure 5B:
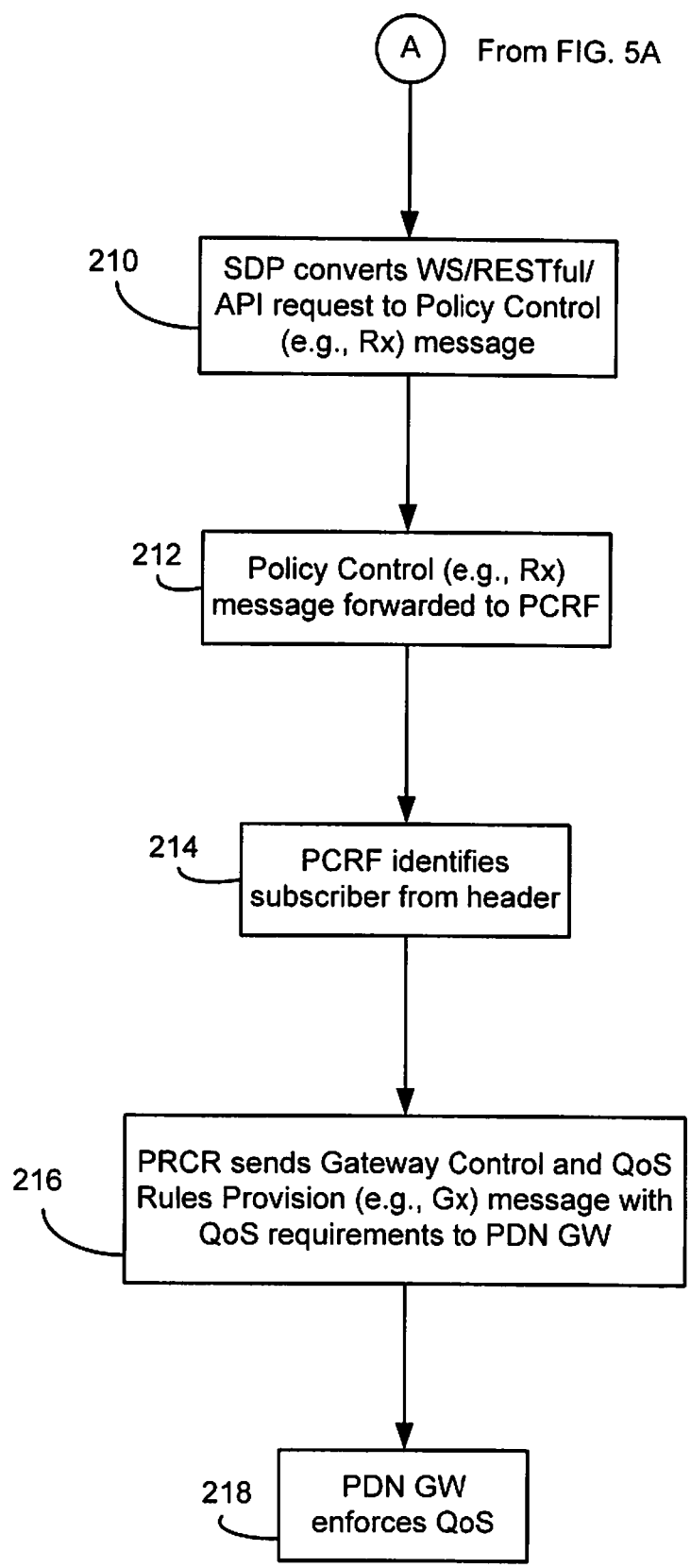

FIGS. 5A and 5B are portions of a flowchart illustrating a method of providing QoS for OTT service providers. With reference to FIGS. 2-5, the method will now be explained. In step 200, the UE 102 initiates an IP-based application (e.g. HTTP) session with the third party AS 122 (such as Google®, Skype®, Vonage®, Facebook®, etc.) by sending an application-dependent message, such as an HTTP message. Next, in step 202, the Proxy Function in the carriers' network, such as the Transparent Proxy 120 (e.g., a Multi-Service Proxy), intercepts the application-dependent message before it traverses any NAT or firewall. The Transparent Proxy may query a database server, such as the AAA server 118, to download the user profile. In step 204, the Transparent Proxy modifies the application-dependent message by adding a unique user ID to the message header (i.e., header enrichment). The Transparent Proxy then forwards the message to the third party AS 122 at step 206. The Transparent Proxy may also include the UE capabilities within the Message header. The third party AS receives the application-dependent message but is completely oblivious to this Message header enrichment. The third party AS 122 then sends a WS/RESTful/API request with the user ID to the SDP 116 with the QoS requirements for this session at step 208. The SDP 116 may be a Services Integration Gateway (SIG) or an Ericsson Composition Engine (ECE). In step 210, the SDP conducts an application layer authentication with the AAA server 118 and converts the WS/RESTful/API request to a Policy Control message, such as an Rx message. The Policy Control message is then forwarded to the PCRF 112 at step 212. The Policy Control message contains the unique subscriber Identification (ID), which was included earlier in the application-dependent message (e.g. HTTP/RTSP) header.

In step 214, upon receiving the Policy Control message from the SDP, the PCRF 112 identifies the subscriber by utilizing the unique subscriber ID. Next, in step 216, the PCRF then sends a gateway control and QoS rules provisioning message (e.g., Gx, Gxa etc.) to the PDN GW 110 with the proper QoS requirements. In step 218, the PDN GW 110 enforces the QoS in the 3/4G RAN 108. The UE may then accomplish an IP-based application (e.g. HTTP) session with the appropriate QoS.

In an alternate embodiment of the present invention, in addition to providing header enrichment with a unique subscriber ID to the application-dependent message, the Transparent Proxy may provide the device capabilities of the UE so that the OTT AS can select the proper content format suitable for that specific UE. Furthermore, the Transparent Proxy may also insert advertisement targeting for the end user. The revenue from the ad insertion can be shared by the OTT service provider and the carrier. In another embodiment, the SIG may prevent Denial of Service (DOS) on the carriers' network by performing the service layer authentication with the AAA server. Additionally, the Transparent Proxy can reformat the content in the downlink based on the user's UE and QoS profile.

There are several advantages over existing systems involving OTT service applications. The present invention enables the end users to have a satisfactory experience for the contents delivered by the OTT service providers. The present invention also allows the OTT service providers and the carriers to develop a beneficial relationship for delivering high quality content to the end users.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of providing a predefined Quality of Service (QoS) level to an Over The Top (OTT) service provider in a wireless telecommunications network in which a User Equipment (UE) initiates an Internet Protocol (IP)-based application session with the OTT service provider by sending an application-dependent message toward an OTT application server, the method comprising the steps of:

intercepting the application-dependent message by a proxy node in the wireless telecommunications network before the message traverses any firewall;

modifying the application-dependent message by the proxy node, wherein the proxy node adds to a header of the application-dependent message, a subscriber identification associated with the UE;

forwarding the modified application-dependent message from the proxy node to the OTT application server, wherein the OTT application server is completely oblivious to the modification of the header of the message;

in response to the modified application-dependent message, sending a request having the subscriber identification from the OTT application server over a communication path that excludes the UE to the telecommunications network with a QoS requirement selected by the OTT application server for the IP-based application session;

determining by a network policy node, an appropriate QoS level for the subscriber based on the subscriber identification and the QoS requirement sent by the OTT application server;

enforcing by a network gateway, the determined QoS level for the IP-based application session with the OTT service provider; and accomplishing with the UE the IP-based application session with the appropriate QoS.

2. The method according to claim 1, wherein the proxy node is a Transparent Proxy.

3. The method according to claim 2, wherein the step of modifying the application-dependent message includes querying by the Transparent Proxy, an Authentication, Authorization, and Accounting (AAA) server for a profile of the subscriber.

4. The method according to claim 1, wherein the step of sending the request includes sending a Web Services (WS)/RESTful/Application Programming Interface (API) request message having the subscriber identification.

5. The method according to claim 4, further comprising the steps of:
intercepting the WS/RESTful/API request by a Service Delivery Platform (SDP) within the telecommunications network; and
performing by the SDP, an application layer authentication with an Authentication, Authorization, and Accounting (AAA) server.

6. The method according to claim 5, wherein the step of intercepting the WS/RESTful/API request includes:
translating the WS/RESTful/API request into a Policy Control message; and
sending the Policy Control message to the network policy node, wherein the network policy node implements a Policy and Charging Rules Function (PCRF).

7. The method according to claim 1, wherein the network gateway is a Packet Data Network Gateway (PDN GW) that enforces the determined QoS level.

8. The method according to claim 1 wherein the application-dependent message is a Hyper Text Transfer Protocol (HTTP) message.

9. The method according to claim 1 wherein the IP-based application session is a Hyper Text Transfer Protocol (HTTP) session.

10. A system for providing Quality of Service (QoS) to an Over The Top (OTT) service provider in a wireless telecommunications network in which a User Equipment (UE) initiates an Internet Protocol (IP)-based application session with the OTT service provider by sending an application-dependent message toward an OTT application server, the system comprising:
an OTT application server for providing an OTT service by the OTT service provider in the wireless telecommunications network, the OTT application server having means for initiating an IP-based application session upon receipt of the application-dependent message;
a proxy function within the telecommunications network, the proxy function including:
a proxy node for intercepting the application-dependent message prior to receipt by the OTT application server before the message traverses any firewall;
the proxy node modifying the application-dependent message by adding to a header of the application-dependent message, a subscriber identification associated with the UE; and
the proxy node for forwarding the modified application-dependent message to the OTT application server, wherein the OTT application server is completely oblivious to the modification of the header of the message;
wherein the OTT application server sends a request having the subscriber identification over a communication path that excludes the UE to the telecommunications network with a QoS requirement selected by the OTT application server for the IP-based application session;
a network policy node for determining an appropriate QoS level for the IP-based application session based on the subscriber identification and the QoS requirement sent by the OTT application server;
a network gateway for enforcing the determined QoS level for the IP-based application session with the OTT service provider; and
the UE accomplishing the IP-based application session with the appropriate QoS.

11. The system according to claim 10, wherein the proxy function is a Transparent Proxy.

12. The system according to claim 11, wherein the Transparent Proxy includes a processor for querying an Authentication, Authorization and Accounting (AAA) server for a profile of the subscriber.

13. The system according to claim 10, wherein the request having the subscriber identification is a Web Services (WS)/RESTful/Application Programming Interface (API) request.

14. The system according to claim 13, further comprising a Service Delivery Platform (SDP), the SDP including:
a port for intercepting the WS/RESTful/API request;
a processor for performing an application layer authentication with an Authentication, Authorization, and Accounting (AAA) server;
the processor for translating the intercepted WS/RESTful/API request into a Policy Control message; and
the port for sending the Policy Control message to a Policy and Charging Rules Function (PCRF).

15. The system according to claim 10, wherein the network gateway is a Packet Data Network Gateway (PDN GW) that enforces the determined QoS level.

16. The system according to claim 10 wherein the application-dependent message is a Hyper Text Transfer Protocol (HTTP) message.

17. The system according to claim 10 wherein the IP-based application session is a Hyper Text Transfer Protocol (HTTP) session.

18. The method according to claim 1, wherein modifying the application-dependent message by the proxy node includes the proxy node adding capabilities of the UE to the header of the application-dependent message.

* * * * *